Feb. 23, 1937.    H. E. WURZBACH ET AL    2,071,373
VIBRATORY APPARATUS
Filed Jan. 12, 1935    4 Sheets-Sheet 1
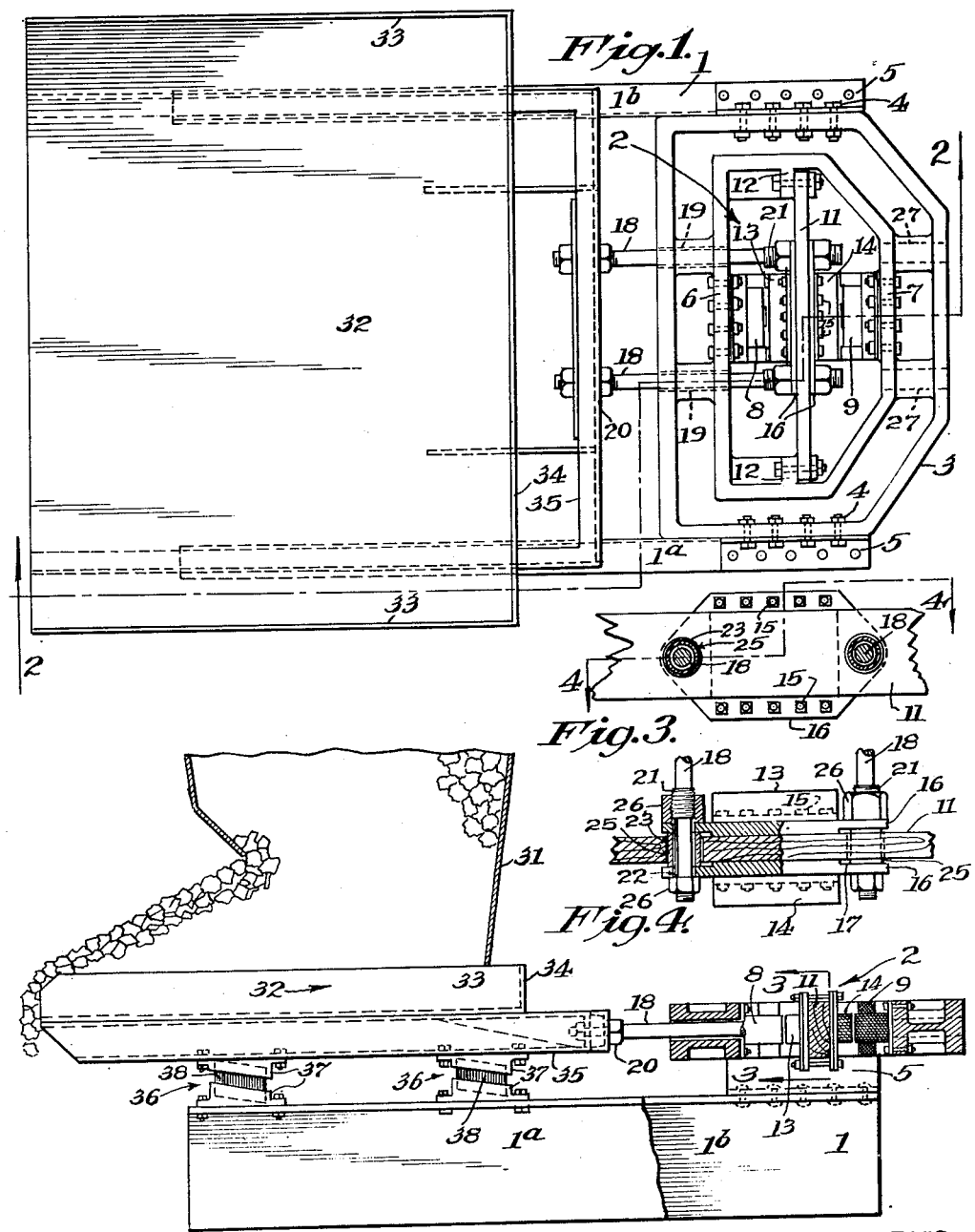
INVENTORS:
Hugh E. Wurzbach and
Clyde H. Konold,
BY
ATTORNEYS.

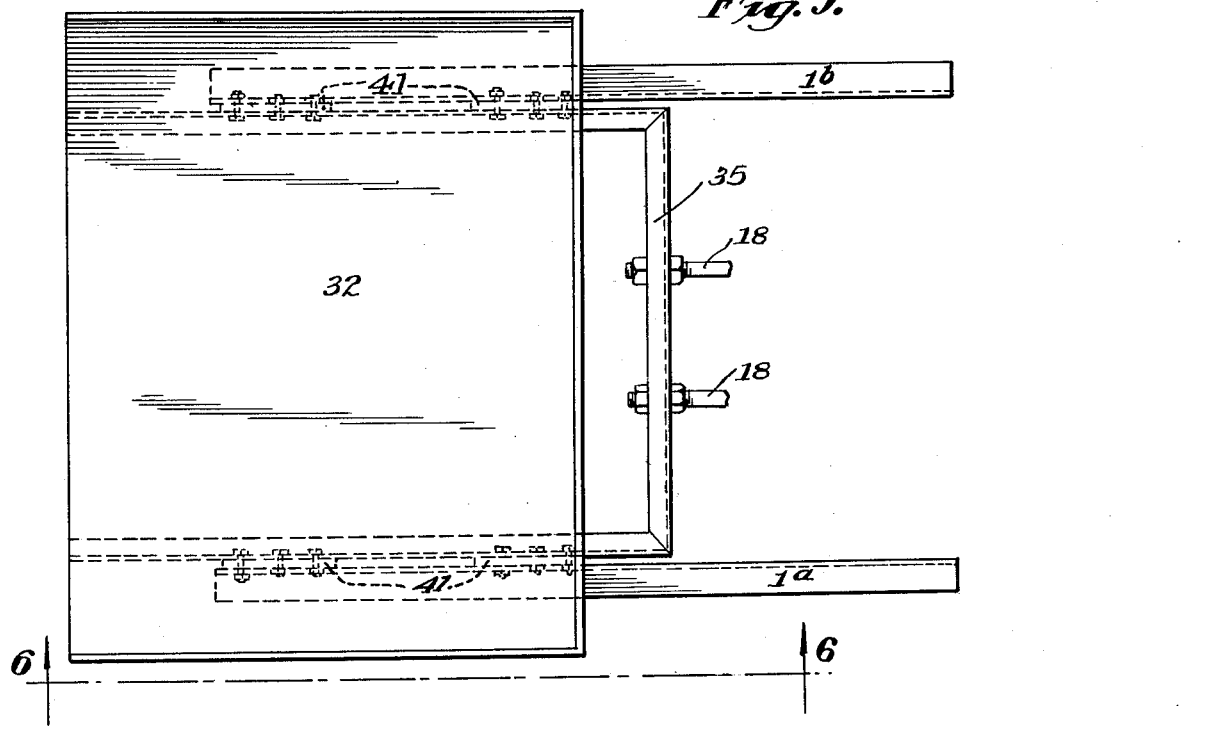
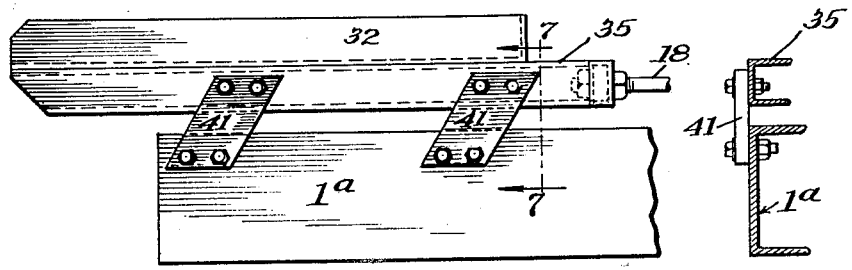

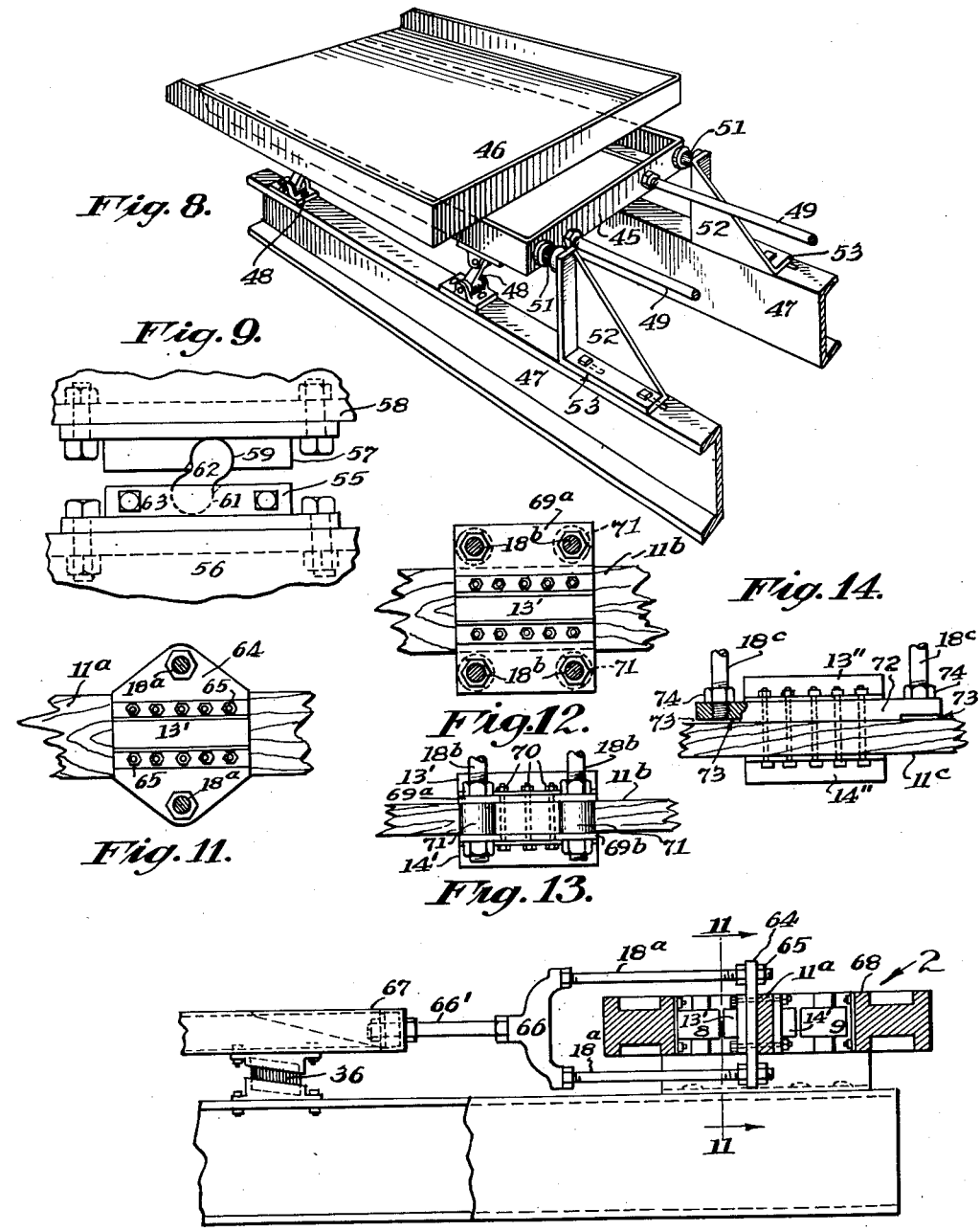

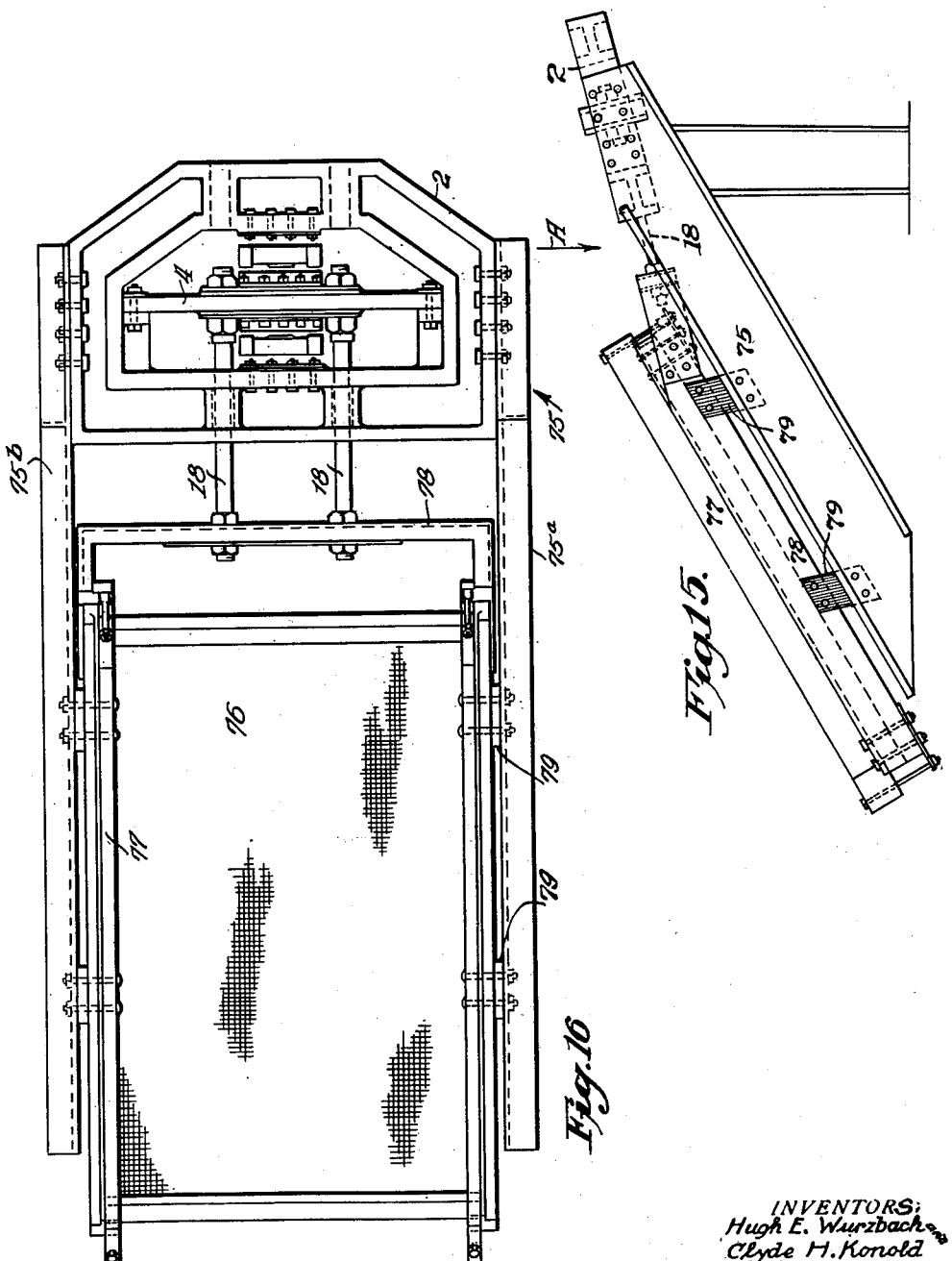

Patented Feb. 23, 1937

2,071,373

UNITED STATES PATENT OFFICE 2,071,373

VIBRATORY APPARATUS

Hugh E. Wurzbach and Clyde H. Konold, Magna, Utah

Application January 12, 1935, Serial No. 1,550

6 Claims. (Cl. 259—72)

This invention relates to vibratory apparatus, and particularly to means for imparting a vibratory motion from a motor means to a feeding device, screening device, shaker device, or the like, and one of the principal objects thereof is to provide a substantial and practical means for connecting a reciprocating device such as an electric vibrating motor to screens, feeders, conveyors, or the like, under such conditions as to give the least resistance to movement within the range of vibrations delivered from the motor.

A further object of the invention is to provide a device comprising a vibrating motor means associated with a vibrated member, in which the vibrated member is so mounted with respect to the vibrating motor means that the gravity load upon the vibrated member is not communicated to the vibrating motor means, except for the gravity load due to the connecting means between the vibrating motor and the vibrated member.

Another of the principal objects of the invention is to provide for transmitting vibratory movements generated in a plane in such manner that the apparatus to be vibrated is caused to have a movement having components in both vertical and horizontal planes, whereby the conveying, screening, or other action of the vibrated member is augmented.

A further object of the invention is to provide advantageous means of communicating or transmitting vibratory movements generated by a vibratory motor means to an associated vibrated member under such conditions as to obtain a uniform or symmetrical vibratory movement of said vibrated member. In our issued United States Patent 1,945,015 we have described a form of vibratory motor means useful according to the present invention, and the following description pertains to a vibratory motor means of such type, but it will be appreciated that the portions of the invention pertaining to the disposition of the vibrated member with respect to the motor means and the mounting of the vibrated member to support the gravity load thereof and to provide for vibration thereof in the desired manner as hereinafter described, are not limited to use with this specific type of motor means, as we may also use other types of vibratory motor means which are adapted to produce forcible vibratory movement in both directions, so that the vibrated member mounting means are not required to exert any substantial part of the force necessary to the actual production of the vibratory motion.

According to the preferred embodiment of the invention, the vibrated member is supported on a suitable frame structure in such manner that at least the horizontal component of the imposed gravity load is resiliently supported or resisted, whereby the vibratory motor means associated with the vibrated member is free to effect a vibratory movement of said vibrated member independent of such horizontal load component.

The accompanying drawings show preferred constructions of the apparatus, together with important modifications thereof, and referring thereto:

Fig. 1 is a plan view of a form of apparatus according to this invention, as applied to vibratory feeder means;

Fig. 2 is a partly sectional view on line 2—2 in Fig. 1;

Fig 3 is a sectional view through a portion of the vibratory motor means, taken on line 3—3 in Fig. 2;

Fig. 4 is a sectional view taken on line 4—4 in Fig. 3;

Fig. 5 is a partly broken-away view corresponding to Fig. 1, showing an alternative embodiment of the supporting means for a vibratory feeder or the like;

Fig. 6 is a side elevation on line 6—6 in Fig. 5;

Fig. 7 is a detail thereof taken on line 7—7 in Fig. 6;

Fig. 8 is a perspective view of a modified form of the apparatus, with the motor means omitted;

Fig. 9 is a detailed view of a modified form of supporting means which may be employed according to the present invention;

Fig. 10 is a partly sectional broken-away view corresponding generally to Fig. 2, illustrating a modification of the means connecting the vibratory motor to the vibrated member;

Fig. 11 is a detail taken on line 11—11 in Fig. 10;

Fig. 12 is a view corresponding to Fig. 11, showing a modified connection of the driving means to the motor means;

Fig. 13 is a plan view of the showing in Fig. 12;

Fig. 14 is a view corresponding to Fig. 13, showing a further modification of the connecting structure;

Fig. 15 is a side elevation of a structure according to the present invention, in which a screen is provided as the vibrated member; and Fig. 16 is a modified plan view thereof, taken in the direction indicated by the arrow "A" in Fig. 15.

Referring to Figs. 1 to 4, a suitable frame structure is indicated at 1, which may comprise two parallel channel members 1a and 1b, and the electric vibratory motor means 2 may be secured to this frame structure in any suitable position, for example, at one end thereof, the frame 3 of said motor means being bolted or otherwise secured as at 4 to a suitable bracket 5 which may be riveted or otherwise secured to the frame members 1a and 1b. The motor frame 3 is provided with forward and rearward frame portions 6 and 7 to which electro-magnets 8 and 9 are secured, in opposing relation. Intermediate the two electro-magnets 8 and 9 we provide a vibratory bar member 11, formed of wood or other suitable material and having its end portions secured to the frame 3 as by means of suitable brackets 12. The vibratory bar 11 is provided adjacent its mid portion with two opposed armatures 13 and 14 constituting the vibrating element of the vibratory motor 2, the armature 13 being associated with the electro-magnet 8 and the armature 14 being associated with the electro-magnet 9. Said electro-magnets may be connected to an energizing circuit in such manner as to provide for alternate energization thereof, as described in said Patent 1,945,015.

Referring particularly to Figs. 3 and 4, the armatures 13 and 14 are secured to the member 11 through the agency of a plurality of bolts 15, and two driving plates 16 (which are preferably formed of a non-magnetic metal such as brass) are provided at opposite sides of the bar 11 between the armatures 13 and 14 to provide a reinforcement of said bar at this point and to provide attachment of driving connection from the bar 11 to the associated structure to which vibrations are to be transmitted. For this purpose the plates 16 may be projected beyond the armatures 13 and 14 in the direction of the bar 11 and are cut away or recessed at their inner faces as at 17 to provide a clearance between the bar 11 and said plates at this point. The driving means for transmitting the desired vibratory motion may comprise two driving rods 18 extending through the frame portion 6 through cored openings 19 and engaging the vibrating element (armatures 13 and 14) through the agency of the plates 16, said rods being preferably provided with enlarged threaded portions 21 extending through suitable openings 22 in the plates 16 and through openings 23 in the bar 11 adjacent the recessed portions 17 of the plates 16. This particular type of construction has been found to be of advantage in preventing failure of the bar 11 at the position of the driving rods 18, and provides for rigid connection of such rods to the armatures 13 and 14. A sleeve or spacing member 25 is preferably provided between the ends of the plates 16 within the opening 23 so that when the nuts 26 are taken up to provide the desired attachment of the rods to said plates, the plate ends are caused to bear against the ends of said sleeve 24 and thus obtain a rigid construction, said sleeve 25 being somewhat smaller than said openings so that ample clearance is provided therebetween. The provision of an enlarged threaded portion 21 in the position above described makes the removal of the rods 18 quite simple, in that the outer nut may be unscrewed from the rod and then the inner nut backed off the portion 21 and the rod pulled through the bar 11 through an opening 27 in line therewith corresponding to the opening 19 above referred to.

In Figs. 1 and 2 the vibratory motor means is shown in driving relation to a shaking feeder, which may be associated with suitable hopper 31 positioned vertically above a table means 32 provided with side and rear walls 33 and 34 and mounted on a vibrated frame 35. The frame 35 is supported upon the main frame members 1a and 1b in such manner as to provide for horizontal vibratory movement with respect to said frame members, while at the same time preferably causing a slight vertical vibratory movement. The type of supporting means shown in Fig. 2 comprises four similar supports 36, each consisting of two opposing receptacles or sockets 37, respectively secured to the vibrated and main frames, within which is disposed a resilient support member 38, which may be formed of rubber or the like. The bases of the sockets 37 and the upper and lower ends of the support members 38 are preferably inclined with respect to the horizontal, in the vertical plane of vibratory movement of the device, so that under the gravity load of the vibrated member, under operating load conditions, said support members will be tilted somewhat in the direction of downward inclination of the engaging faces of said support members and said sockets. Hence, upon vibratory movement of the frame 35 through the agency of the vibratory motor means 2 and the associated driving rods 18, which are connected to said frame as at 20, there will be a tendency for the purely horizontal travel of the rods 18 to result in an oblique travel of the frame 35, by imparting to such motion a vertical component. The length of the driving rods is preferably so adjusted that, when the above described tilting of the support members 38 has taken place, the vibrating element of the vibratory motor means 2 is substantially in neutral position, that is, the armatures 13 and 14 are symmetrically spaced with respect to the cooperating electro-magnets 8 and 9, and the vibratory bar 11 is in unstrained condition. Thus, the vibrated member, including frame 35, is supported for vibratory motion in a path having horizontal and vertical components, and the component of force exerted by said vibrated member, in a direction parallel to the plane of vibration of the vibratory motor means, due to the tendency of said vibrated member to move downwardly along said path under the action of gravity, is resisted and supported by the deformation of the rubber support members 38 instead of being supported by displacement of the bar 11 from its neutral or unstrained position.

In Figs. 5, 6, and 7, the table means 32 and its associated frame member 35 are mounted on the main frame members 1a and 1b through the agency of a plurality of inclined resilient supporting members 41, which may consist of strips of sheet rubber of suitable length and thickness. These members 41 are bolted at their upper and lower ends to the frame 35 and frame members 1a and 1b and inclined in the direction of horizontal vibratory movement of the frame 35 so that upon horizontal movement of the driving rods 18 the deformation of the supports 41 will result in a vertical component of motion being imparted to the frame 35. In adjusting the device for operation, the driving rods 18 are loosened, preferably adjacent the point of attachment thereof to the frame 35, the gravity load caused by the said frame plus the weight of material present thereon is allowed to be impressed freely upon the resilient supporting members 41, which causes an increased inclination thereof toward the motor means until a sufficient restoring force is built up in said members 41 to balance the horizontal component of such gravity load. The driving rods are then taken up and the device is ready for operation. This procedure of adjustment takes the horizontal gravity load component off the resilient vibratory bar 11, allowing said bar and the attached armatures to rest equidistant between the electro-magnets 8 and 9, and thus, upon energization of said electro-magnets, the vibratory movement of said bar is symmetrical with respect thereto. The form of apparatus shown in Figs. 5 to 7 is more adapted for the handling of light-weight materials, or for use in light-weight or small vibratory apparatus, and for the handling of heavy materials or in large forms of apparatus the form shown in Figs. 1 to 4 or one of the subsequently described forms of apparatus is more suitable.

In Fig. 8 we have shown a modified structure in which a frame 45 carrying a conveyor or feeder table 46 is mounted on a frame 47 through a plurality of pivoted links 48 which provide for a longitudinal movement of said frame and define the vibratory path thereof. The links are preferably disposed in an inclined relation whereby the desired path having both vertical and horizontal components is defined, after the manner of the inclination of the supports 41, for example, such that the horizontal component of the vibratory path of said screen is toward the vibratory motor means, the driving rods for which are shown at 49. In this embodiment of the invention suitable resilient stop means are provided to absorb the proportion of the gravity load which results from the horizontal component of motion of said frame, which means may comprise two rubber pads or stops 51 mounted on brackets 52 which are preferably mounted for longitudinal adjustment on the frame 47. The rubber stops may be mounted on a suitable threaded member so that a convenient adjustment of the angle of disposition of the links 48 may be effected, if desired, in place of the adjustable mounting shown at 53. This form of the invention is susceptible to adjustment of the neutral position of the vibrating bar member of the motor means in a manner equivalent to the form shown in Figs. 5 to 7, either by adjustment of the rods 49 or the supports 52.

Fig. 9 shows a modified support means of the general character of the type shown in Fig. 7, in which a bottom plate 55 is secured to the frame member 56 corresponding to the member 47 and a top plate 57 is secured to the vibrating frame 58, said top and bottom plates being provided with cylindrical recesses 59 and 61 adapted to receive a co-operatively shaped link member 62. A suitable retaining plate or the like is preferably provided adjacent the plate 55, as at 63, to retain the member 62 against lateral displacement with respect to said bottom plate, the rigidity of the driving rods by which the vibrated frame member is attached to the vibratory motor being adequate to prevent lateral shifting of the said frame.

In Figs. 10 and 11 the vibratory bar 11a, provided with armatures 13' and 14', is secured to a non-magnetic drive plate 64 in any suitable manner as by means of a plurality of bolts 65 which may also secure the armatures in place, said drive plate extending upwardly and downwardly away from the vibratory bar 11a to provide attachment for two driving rods 18a which may be brought together by means of a yoke 66 and connected to a vibrating frame 67 through a single drive rod 66'. For purposes of illustration a resilient supporting means 36 of the type illustrated in Fig. 2 is provided for the vibrating frame structure, though it will be appreciated that supporting means of the type illustrated in Figs. 5, 8, or 9 may be equivalently employed, a suitable stop means comparable to the means 51 being employed where supporting means of the type shown in Figs. 8 and 9 are employed. The general construction of the vibratory motor means indicated at 68 may be the same as that shown in Figs. 1 to 4, with the exception of the above noted modifications in the method of mounting the driving rods.

In Figs. 12 and 13 we have shown a modification of the driving plate and driving rod construction, in which a vibratory bar 11b is clamped between two upwardly and downwardly projecting driving plates 69a and 69b, to which the armatures 13' and 14' may be secured by means of suitable bolts indicated at 70. The driving rods 18b, four in number in this particular modification, are bolted through suitable openings in the plates 69a and 69b, and suitable spacing elements 71 are preferably positioned between said plates at the position of said rods to provide a solid driving connection, after the manner of the spacing members or sleeves 25, said spacing elements being preferably formed of a non-magnetic material such as brass, hardwood, bakelite, or the like.

In Fig. 14 we have shown a construction in which a vibrating bar 11c is provided with a single drive plate 72 having portions projecting beyond the ends of the armatures 13'' and 14'' and recessed as at 73 to provide a clearance between said plate and the bar 11c at the position of attachment of the driving rods 18c, said rods being threadedly secured to said plate and locked in place through suitable jamb nuts 74.

Figs. 15 and 16 illustrate the adaptation of the mounting structure of the present invention to a vibratory screening apparatus and referring thereto: The main frame structure is indicated at 75, consisting of two opposing channel members 75a and 75b mounted in an inclined relation to the upper ends of which is secured a motor 2 which may consist of a structure fully comparable to the motor structure shown in detail in Figs. 1 to 4. A screen 76 is mounted within a suitable screen frame 77 which is in turn mounted on a vibratory frame 78 provided with driving attachment to the vibratory rod 18. The frame 78 may be mounted on the frame 75 through the agency of vibratory supports of any of the types previously described, though we have actually shown a supporting structure corresponding to that illustrated in Figs. 5 to 7, comprising a plurality of resilient supporting members 79, corresponding to the members 41, secured at their upper and lower ends to the frame portions 78 and 75 and disposed substantially normal with respect to the plane of movement of the driving rods 18 so that substantially all points in the plane of the screen 76 will be given a vibratory movement in a direction substantially parallel to the aforementioned plane of movement of said driving rods.

The particular angle of disposition of the vibratory motor means with respect to the plane of the screen or feeder construction employed is subject to material modification, dependent upon the nature of the vibratory movement desired, it being apparent that the apparatus may be so adjusted that no component of the gravity load of such screen or feeder is impressed upon the vibrating bar of the motor means.

We claim:
1. In a vibratory apparatus, a vibratory motor means comprising an elongated resilient vibratory member having a relatively fixed portion and a vibratory portion supported for vibration in a direction transverse to the length thereof, a vibrating element secured to said vibratory member adjacent the vibratory portion thereof and provided with rigid driving plate means; a vibrated member; means separately supporting said vibrated member for vibration in a path having a substantial component parallel to the direction of vibration of said vibratory member; and driving rod means connected to said driving plate means and to said vibrated member.

2. In a vibratory apparatus, a vibratory motor means comprising: an elongated resilient vibratory member supported for vibration in a plane; a vibrating element secured to said vibratory member and provided with rigid driving plate means; a vibrated member; driving rod means connected to said driving plate means and to said vibrated member, said driving plate means comprising a plate member clamped in engagement with said vibratory member and having recessed portions spaced from said vibratory member adjacent the position of connection of said driving rod means; and means separately supporting said vibrated member for vibration in a path having a substantial component parallel to the plane of vibration of said vibratory member.

3. In a vibratory apparatus, a vibratory motor means comprising: an elongated resilient vibratory member supported for vibration in a plane; a vibrating element secured to said vibratory member and provided with rigid driving plate means comprising two parallel driving plates clamped in engagement with opposite sides of said vibratory member in the plane of vibration thereof and having recessed portions projecting beyond the opposite ends of said vibrating element and spaced from said vibratory member, said vibratory member having an opening extending therethrough in the plane of vibration thereof at positions adjacent the respective projecting portions of said driving plates; a vibrated member; means separately supporting said vibrated member for vibration in a path having a substantial component parallel to the plane of vibration of said vibratory member; and driving rod means extending through the respective openings in said vibratory member and secured to both of said driving plates and to said vibrated member.

4. The invention set forth in claim 3, and comprising in addition, spacing means positioned within the respective openings in said vibratory member and engaging said driving plates at said recessed portions.

5. In a vibratory apparatus, a frame structure; a vibrated member; means on said frame structure supporting said vibrated member for vibratory movement in a path having vertical and horizontal components; a vibrating element secured to said frame structure and having a portion mounted for vibratory movement in a path having a substantial component parallel to the path of movement of said vibrated member; armature means mounted on said vibrating element at said vibratory portion; separate electromagnet means mounted on said frame structure at each side of and acting separately upon said armature means in opposite directions in the path of vibratory movement of said vibrating element; and driving means operatively connecting said vibrating element to said vibrated member, said vibrated member tending to move in one direction along said first-named path due to the action of gravity and said supporting means including a rubber member mounted on said frame structure and engaging said vibrated member to resiliently resist said movement in said one direction.

6. The apparatus set forth in claim 5, said rubber member being so positioned with respect to said vibrated member as to position the thereto-connected vibrating element and the armature means carried thereby at a neutral position intermediate said electromagnets when said vibrated member is in a rest position.

HUGH E. WURZBACH.
CLYDE H. KONOLD.